«12» United States Patent
Matsubara et al.

(10) Patent No.: US 7,769,881 B2
(45) Date of Patent: Aug. 3, 2010

(54) METHOD AND APPARATUS FOR PEER-TO PEER ACCESS

(75) Inventors: Daisuke Matsubara, Santa Clara, CA (US); Kazuho Miki, San Francisco, CA (US)

(73) Assignee: Hitachi, Ltd., Tokyo (JP)

( * ) Notice: Subject to any disclaimer, the term of this patent is extended or adjusted under 35 U.S.C. 154(b) by 1114 days.

(21) Appl. No.: 10/351,197

(22) Filed: Jan. 24, 2003

(65) Prior Publication Data

US 2004/0148434 A1 Jul. 29, 2004

(51) Int. Cl.
*G06F 15/16* (2006.01)
(52) U.S. Cl. .................. 709/232; 709/204; 709/217; 709/246
(58) Field of Classification Search ................. 709/204, 709/217, 232, 246
See application file for complete search history.

(56) References Cited

U.S. PATENT DOCUMENTS 5,802,313 A 9/1998 Mitchell et al.
6,336,135 B1 1/2002 Niblett et al.
6,366,907 B1 * 4/2002 Fanning et al. ................ 707/3
6,442,611 B1 8/2002 Navarre et al.
2002/0032725 A1 3/2002 Araujo et al.
2002/0062310 A1 * 5/2002 Marmor et al. ................ 707/3
2002/0062375 A1 * 5/2002 Teodosiu et al. ............ 709/226
2002/0131427 A1 9/2002 Niermann
2002/0143855 A1 10/2002 Traversat et al.
2003/0018712 A1 * 1/2003 Harrow et al. .............. 709/203
2003/0095660 A1 * 5/2003 Lee et al. .................... 380/231
2004/0010553 A1 * 1/2004 Katz et al. .................. 709/206
2006/0107297 A1 * 5/2006 Toyama et al. ............. 725/105

* cited by examiner

*Primary Examiner*—Moustafa M Meky
*Assistant Examiner*—Avi Gold
(74) *Attorney, Agent, or Firm*—Townsend and Townsend and Crew LLP

(57) ABSTRACT

In a specific embodiment of the invention, a peer-to-peer interfacing device is described. The particular embodiment of the invention facilitates access by a Web browser, allowing a Web user to benefit from the access capability of a peer-to-peer network, such as file sharing. The interfacing device can communicate using a standard protocol (e.g., HTML), thus allowing the Web user to access the peer-to-peer network with a conventional Web browser. The interfacing device can interact on the peer-to-peer network side, and thus appears to the peer-to-peer network as a peer machine.

3 Claims, 11 Drawing Sheets

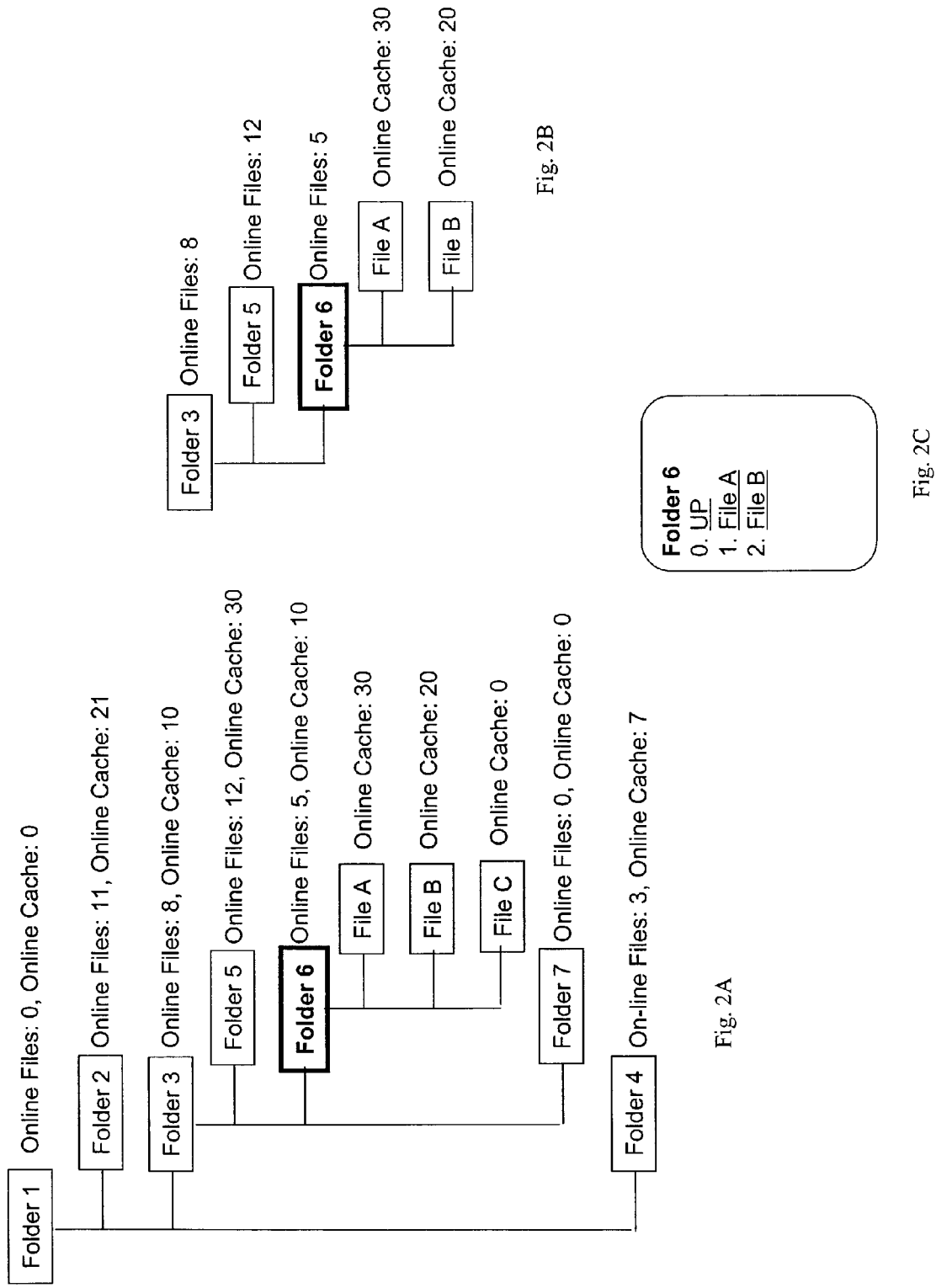

METHOD AND APPARATUS FOR PEER-TO PEER ACCESS

CROSS-REFERENCES TO RELATED APPLICATIONS

This application is related to commonly owned, U.S. application Ser. No. 10/159,144, now U.S. Pat. No. 7,574,488 titled "METHOD AND APPARATUS FOR PEER-TO-PEER FILE SHARING," issued on Aug. 11, 2009.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to network systems and in particular to file sharing with a peer-to-peer network.

Peer-to-peer (P2P) is a communications model in which each party has the same capability and any party can initiate a communication session with another party on the P2P network. In some implementations, P2P communications is implemented by giving each communication node both server and client functionality. In a specific application, P2P has come to describe applications in which user can use the Internet to exchange files with each other directly or through a mediating server.

On the Internet, P2P can be viewed as a type of transient network that allows a group of users to connect with each other and access files from one another's systems. Napster and Gnutella are popular examples of this class of P2P software. To participate in a P2P network, the user must download and install a P2P networking program (P2P browser). The P2P browser allows the user to communicate with other P2P browsers in the P2P network, via a suitable P2P protocol. The user thus becomes a P2P node on the network.

In a "pure" P2P network, the constituent components comprise of only the users. File sharing is achieved by determining the nodes presently on the P2P network, and communication with each such node to identify the list of available files. Initially, a peer user must explicitly access another peer that is online. For example, a Web site can provided with IP addresses of other peer machines. When the user "connects" to another live machine (i.e., one that is executing the P2P program), that other live machine then tells the other peers that it has already established contact with about the new peer. Each of those peers then tell peers they know about, who tell other peers and so on. Alternatively, rather than "pushing" information out, the user's P2P program can "pull" in information about connected peers. Thus, the user's machine can obtain from the other machine a list of peers that it knows about. The user's machine can then query the other machines to identify still other machines on the P2P network, and so on. In this way, a peer can become aware of the other peers in the P2P network.

To facilitate file sharing, a "hybrid" P2P network can be configured. File sharing in a "hybrid" P2P network involves the user specifying which of her files from her computer (local computer) are to be shared P2P network, and uploading information about those files to a management (index) server. The information typically includes file location (e.g., IP address of the local computer, the directory in which each file is located, etc.) and indexing information which might include file name, file type, and so on. The most popular of such hybrid P2P networks was Napster, which utilized a central index server.

Another P2P user can then perform a search in the management server (via his P2P browser) of the file information maintained in the management server. The user then can then access the file from the file owner's computer, based on file location information obtained from the management server.

Some roadblocks to the widespread use of the P2P network paradigm are apparent, aside from certain legal implications. For example, accessing a P2P network requires that each system downloads and install P2P access software, a requirement which people may be reluctant to meet. A reason for the reluctance may be the additional processing load imposed on a machine acting as a P2P node. A more serious concern is that each hardware platform that can access the Internet is a prime candidate as a P2P node, requiring software to be developed for that platform. In addition to the conventional PC (personal computer), other Internet-ready devices include cell phones, automobile navigation systems, personal data accessories, and so on. P2P may not be appropriate for mobile terminal where computing capacity is insufficient; e.g., insufficient bandwidth to handle the flow of information needed to be a peer in the network, insufficient memory or storage capacity to serve files, and generally insufficient capacity to provide complex P2P processing to support other peer members.

It can be appreciated then that there is a need to facilitate access to and participation in a P2P network.

SUMMARY OF THE INVENTION

Embodiments of the invention include a method and a system for accessing a network based on a first network communication protocol from a node in a network based on a network communication protocol different from the first network communication protocol. In a particular embodiment of the invention, a gateway server provides access to a peer-to-peer (P2P) network from a Web browser. More generally, embodiments of the present invention can access a P2P network from a node using messages that conform to a protocol other than the P2P protocol used in the P2P network.

BRIEF DESCRIPTION OF THE DRAWINGS

The present invention can be appreciated by the description which follows in conjunction with the following figures, wherein:

FIGS. 2A-2C illustrate an aspect of the invention wherein the amount of information that can be conveyed and/or displayed varies depending on a configuration of the client;

DESCRIPTION OF THE SPECIFIC EMBODIMENTS

Figure 1:
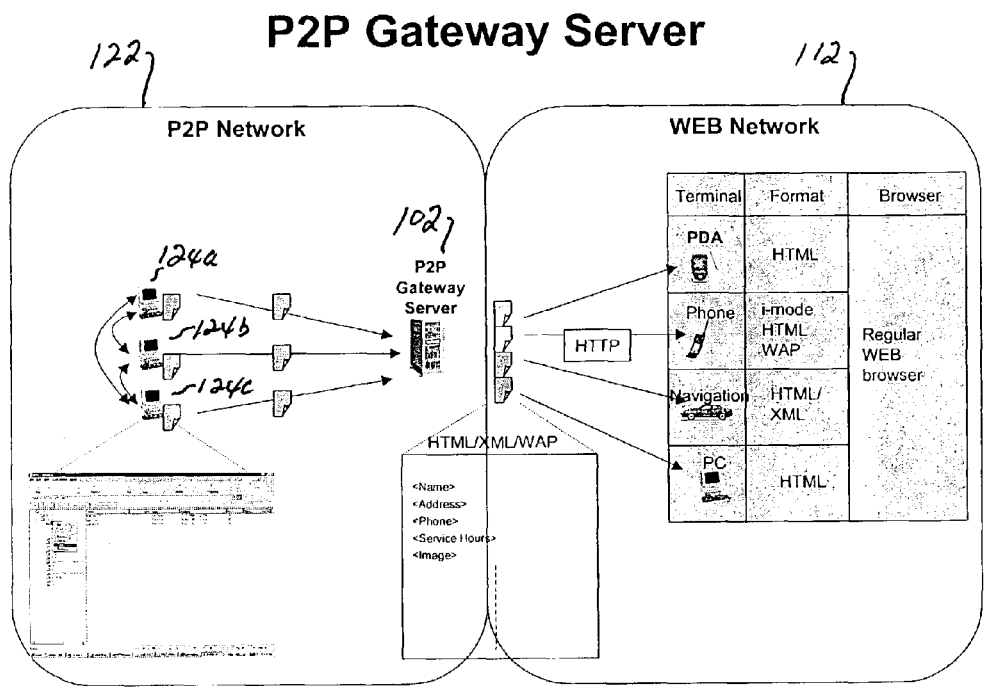
FIG. 1 is a schematic diagram illustrating a networked communication system according to an embodiment of the present invention.

FIG. 1 is a high level generalized block diagram showing a networked communication system incorporating the present invention. For discussion purposes, the figure shows a Web-based network 112 using the HTTP (hypertext transport protocol) networking communication protocol is shown. The figure also shows a peer-to-peer (P2P) network 122 comprising a plurality of peers 124a-124c, for example. A P2P gateway server 102 represents an illustrative embodiment of the present invention.

Thought the description which follows is for an embodiment which is based on HTTP, it can be appreciated that the invention is not restricted to using HTTP. The present invention is directed to accessing a P2P network from a node that transmits messages which conform to a protocol that is different from the P2P protocol used in the P2P network. It can be appreciated therefore that many alternative embodiments of the present invention can access a P2P network using any conventional internet protocol such as HTTP, FTP (file transfer protocol, SOAP (simple object access protocol, a protocol for WEB Services), SIP (session initiation protocol, a signaling protocol for multi-media communication), POP3/IMAP (post office protocol, a protocol & internet message access protocol, for receiving e-mail), SMTP (simple mail transfer protocol, for sending e-mail), and so on. It can be appreciated that access to the first P2P network can even be made from a node in a second P2P network using a P2P protocol different from the protocol of the first P2P network. Embodiments of the client application can be clients other than a WEB browser; e.g., SOAP client, SIP client, email client, an so on.

The Web-based network 112 comprises nodes which can execute a suitable networking program (commonly referred to as a Web browser) that can access a communication network and communicate with another node using the HTTP network communication protocol. The worldwide Web (WWW, "the Web") is a client/server networking paradigm, one of the most common distributed computing models. In the client/server architecture, clients request services and servers provide those services. A variety of servers are known, including Web servers, mail servers, FTP servers, and so on.

Client nodes on a Web execute a browser application which communicates with a Web server via HTTP. Typically, the communications comprises requests for image and text files which can then be displayed visually or are otherwise presented by the browser application. The communication network typically will be the Internet, but of course can be a local network, or some other suitable network architecture.

The network nodes are typically PCs (personal computers) running a suitable browser application. However, other devices are also possible. FIG. 1 shows various examples, including a personal data assistant (PDA), cellular phones, and navigation systems (e.g., automobile navigation systems).

FIG. 1 also shows various file types that can be communicated in the Web. While conventional text-only files can be provided from a server, the power of the Web lies in its use of hyperlinked text files, and in general hyperlinked files of any type. Web-page files include special information providing logical links to other files which can be displayed by an appropriate browser. The figure shows variants of the basic HTML (hypertext markup language) language for creating such files, including but not limited to XML, and WAP.

The P2P network 122 comprises nodes in a communication network which execute a P2P networking program (variously referred to as a P2P browser, P2P peer program, servant program) that allow nodes in the P2P network (peers, peer terminals) to communicate with each other. Unlike, the client/server model, each peer in the P2P network can act as a client, requesting and posting files to other peers, and as a server, providing access to files and performing operations requested by other peers. A P2P networking program communicates with peer nodes on the P2P network using a suitable P2P network communication protocol; for example, Gnutella, Napster, and Jxta a P2P protocol recently announced by Sun Microsystems, Inc.

The communication network underlying the Web and the P2P network can be the Internet. However, it can be appreciated that underlying communication network can be different for the Web and for the P2P network. It will be clear that the invention can be adapted to operate in a heterogeneous collection of networks as well as in a homogeneous network.

FIG. 1 shows that the P2P gateway server 102 exchanges information (e.g., requests) with the Web using the HTTP network communication protocol and exchanges information with the P2P network using a suitable P2P network communication protocol. In accordance with the invention, the P2P gateway server performs an operation which in effect translates certain requests from one network (e.g., the Web) into equivalent requests on the other network (e.g., P2P), and vice versa. The P2P gateway server in effect allows a Web user to provide access to the P2P network.

In an alternate embodiment, the network component 112 can be a P2P network using a P2P networking protocol that is different from the P2P networking protocol used in the network 122. Access to the first P2P network 122 from a node in the second P2P network can be via the gateway server 102 in the manner summarized above and explained in more detail below, where the gateway server is appropriately configured to handle the second P2P networking protocol.

Figure 2:
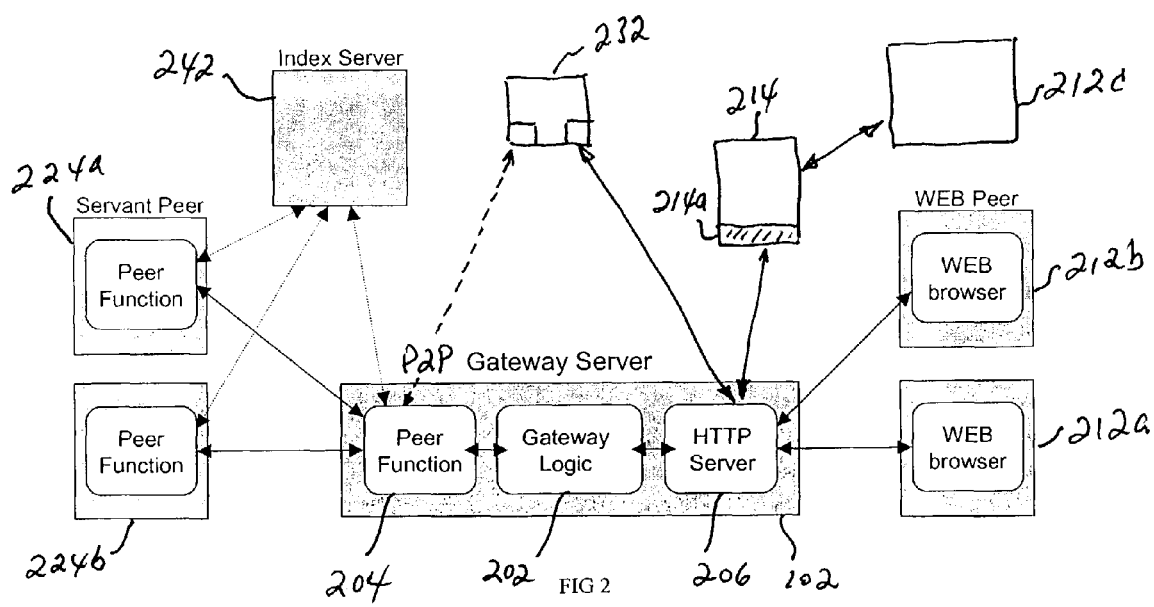
FIG. 2 is a high level block diagram highlighting functional blocks of an illustrative embodiment of a peer-to-peer gateway server according to the invention.
Figure 2:
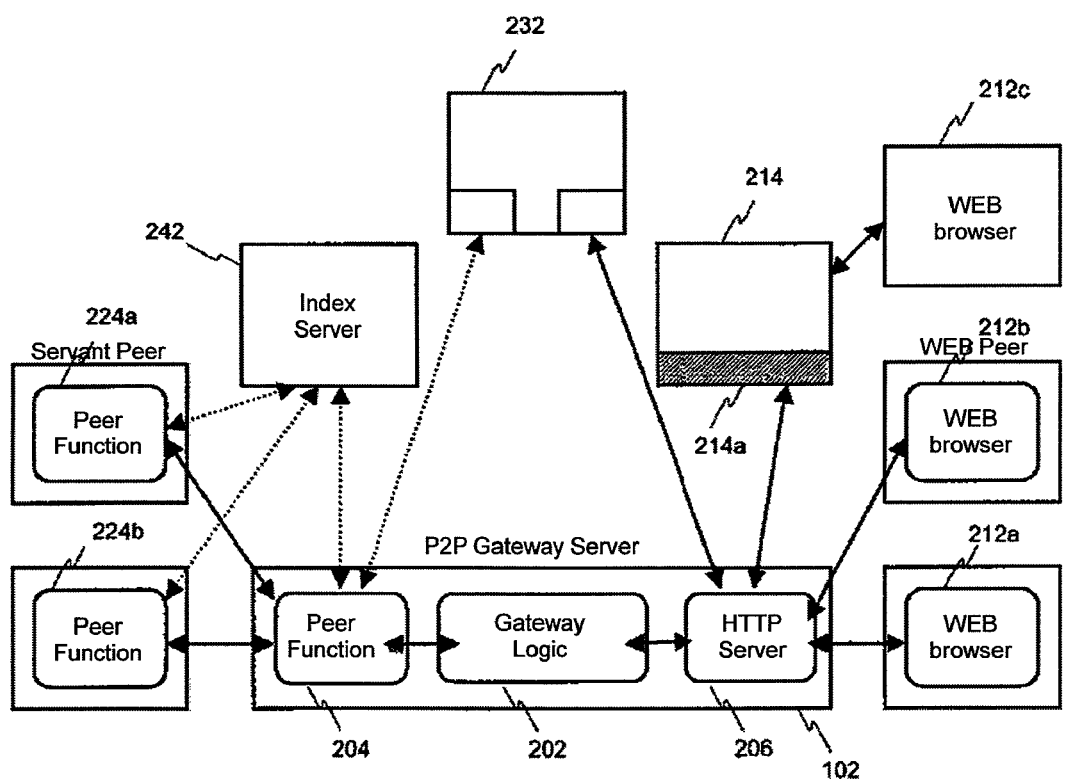

FIG. 2 shows a implementation exemplar of the P2P gateway server 102 shown in FIG. 1. In a particular configuration, the P2P gateway server can be a PC server with an Intel® Pentium® CPU, configured with SDRAM, and having a hard disk drive for storage. It can be appreciated, however, that any suitable hardware platform can be used.

The P2P gateway server 102 can run on a Linux operating system and comprises software components including gateway logic 202, a peer function component 204, and a HTTP server component 206. As can be appreciated, the HTTP server includes code for providing a conventional HTTP server interface to which Web browsers can connect. A IRL (universal resource locator) can be assigned to the P2P gateway server. For example, FIG. 2 shows Web browsers 212a and 212b accessing the P2P gateway server via the HTTP server component 206. From the point of view of the Web browsers, the P2P gateway server is simply another Web site. The figure also shows that a Web server at a Web site 214 can access the P2P gateway server via the HTTP server component, for example, by way of a client component 214a in the Web server. This scenario considers the possibility that a Web browser can access a Web site, which in turn can cause the Web site to access the P2P network 122 (FIG. 1) via the P2P gateway server.

The peer function component 204 includes a front end comprising P2P network access functionality. This allows the peer function component to appear to the P2P network 122 as another peer, thus providing access to the peers 224a, 224b in the P2P network. In a pure, P2P network, each peer learns of other peers in the network incrementally. A peer must first contact another peer in the network which then informs the first peer of other peers it knows about. The first peer then contact these other peers and continues the process.

In a "hybrid" P2P network configuration, an index server 242 is provided. The P2P networking program of a peer in a hybrid P2P network will register the peer to the index server. In addition, information representing the files and their organization in the peer machine is uploaded to the index server. In an implementation of the P2P gateway server 102 in which the P2P network is of the hybrid variety, it can be appreciated that the peer function component 204 can be configured to interact with the index server 214. The interface between the index server 242 and the P2P gateway server can be a P2P based interface, so the peer function component is used to access the index server as if it was another peer. Alternatively, a custom interface can be provided, which allows the gateway logic 202 to access to the data store in a "backdoor" manner that does not require an exchange of P2P messages. It can be appreciated that still other arrangements are possible.

The gateway logic 202 is a component which provides functionality interact with peers in the P2P network in response to messages from a Web browser, and to interact with a Web browser in response to messages received from the P2P network. In the case of a hybrid P2P network, interaction with the index server may also occur. The gateway logic can be implemented in numerous ways.

When the HTTP server component 206 receives a message from a Web client, some representation of the message is provided to the gateway logic 202. One or more subsequent messages are then generated by the gateway logic and provided to the peer function component 204. The peer function component then communicates the subsequent message(s) to the P2P network. This may involve communicating with one or more peers, or in the case of a hybrid P2P network, the peer function component 204 may communicate with an index server 214 as well.

Conversely, when the peer function component 204 receives messages from the P2P network (peers or index server) some representation of those messages are provided the gateway logic 202. The gateway logic then generates one or more messages suitable for the browser. This may include generating a suitable Web page based on the information received from the P2P network. It may include populating fields in a template Web page, based on information received from the P2P network. The HTTP server component 206 then communicates the Web page or some other appropriate message back to the Web server.

According to an aspect of the invention, the P2P gateway can customize the kind of information to be included in the message, based on factors such as, but certainly not limited to, user preference, system configuration, and terminal configuration/capacity (e.g., CPU power, memory, display capability, and so on), network capacity (e.g., bandwidth). For example, the P2P gateway can send complete information about the P2P network to a PC that has high bandwidth and storage capacity to receive and store such information. On the other hand, the P2P gateway may send only a digest of the information to a mobile phone. The P2P gateway may also perform media conversion for certain information. For example, digital contents such as digital images and movies may be "massaged" in a manner suitable for the receiving machine. Thus, the P2P gateway can increase, reduce, or otherwise modify the data size, image size, resolution, etc. of digital files of a image in an attempt to accommodate the configuration (e.g., restrictions, limitations) of the receiving terminal or the network (e.g., bandwidth, CPU power, memory, display size, and so on.)

FIGS. 2A-2C are illustrative of this aspect of the invention. FIG. 2A shows an example of information that can be presented on a large display, such as might be associated with a desktop PC. The example shows a display of a custom message for conveying virtual directory information. The message can include complete directory information, showing a hierarchy of files and subfolders. A selected or otherwise designated folder (Folder 6) can be displayed with its child folders and files. Additional information can also be displayed. For example, information can include the number of current online files and online cache in each folder, and also the number of online cache for each file. The display of the files and folders can be sorted based on the number of online files or cache. For example, it can be sorted, in order of decreasing (or increasing) numbers of online files (or cache). Folders which do not have any online files and which do not have any child folders can be displayed differently, for example they may be grayed out.

FIG. 2B illustrates how the presentation can be modified for a smaller display is, such as a PDA. The message from the P2P gateway can convey a subset of the information (digest information) that might be present in a message targeted for a larger display. Thus, for example, the message can contain information only for the designated folder (Folder 6) and its immediate family of folders (parent folder 3 and sibling folder 5). The message can also convey additional information such as the number of current online files in each folder (no information for online cache), and the number of online cache for each file. If the file does not have online cache, or if the folder does not have any online files, information for those files or folders can be omitted from the message. The smaller amount of information can be more practically transmitted to a device such as a PDA which tends to have a lower bandwidth communication capability. Also, the reduction in information is more readily accommodated in smaller display. However, it can be appreciated that capability which do not consume display area, such as sorting can still be provided, as explained for example in connection with the display of FIG. 2A.

FIG. 2C illustrates what could be a minimum capacity configuration such as might be found in a mobile phone. Here, the information is reduced to the contents of the selected folder (Folder 6). Very little, or no information about the online cache is conveyed from the P2P gateway; or if it is, it may not be displayed, depending on the available display area on the device. Scrolling through the display may be used to allow the user to access files, because it is not likely that all the files in a folder can be viewed at one time, which of course may be the case in the larger display configurations as well.

It is the nature of software that functional boundaries are typically very easy to define. Thus, the configuration of the peer function component 204, gateway logic 202, and HTTP server component 206 shown in FIG. 2 is not necessary. The functionality of the gateway logic 202 can be incorporated in varying degrees into either or both of the peer function component and HTTP server component. The figure serves to identify the functionality more than a particular implementation. In a specific implementation, nevertheless, separate software modules are provided for each component 202-206.

To complete the discussion of FIG. 2, a node 232 is shown, illustrating a situation where the node can be executing a P2P networking program and a Web browser. Thus, on the one hand, the node can act as a peer in the P2P network using a P2P network communication protocol, while on the other hand, the node is also a Web client using a different network communication protocol. While such a configuration is not common, it emphasizes that the same node can be part of multiple networks when provided with suitable software.

Figure 3:
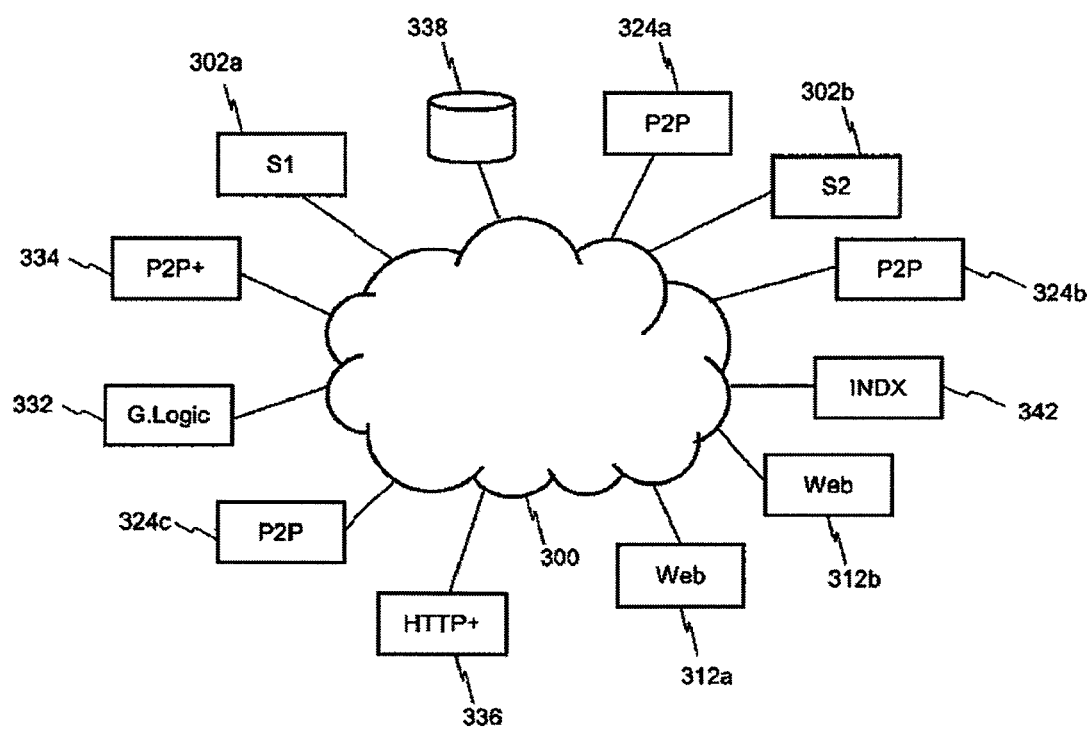
FIG. 3 is a diagrammatic representation of a networked communication system according to the present invention.

FIG. 3 illustrates a generalized embodiment of the present invention. A communication network 300 represents any kind of underlying network or combination of networks. The communication network can connect together plural communication nodes, and supports communication among the nodes using a plurality of known communication protocols. The figure shows that some nodes 312a, 312b operate Web browsing software, while other nodes 324a-324c operate P2P networking programs. The peer nodes 324a-324c constitute a P2P network. An index server 342 can be provided if the P2P network is a hybrid P2P network.

As shown in FIG. 3, a P2P gateway server 302 can be provided as a single machine. However, it can be appreciated the P2P gateway server can be distributed architecture, being implemented as separate machine components to provide a peer function 204, gateway logic 202, and an HTTP server 206 as separate nodes in the network. Thus, for example, a peer function machine 334 can provide an access point to the P2P network. The "+" sign indicates that the machine, in addition to executing a suitable P2P networking program, includes program code for network access to the gateway logic component 332 of the P2P gateway server. An HTTP server machine 336 provides a suitable access point for the Web browsers. Again, the "+" sign indicates that the machine includes additional program code to allow network communication with the gateway logic component, which can be provided in a machine 332. Of course, two or more of these machines can be combined. Also, there is no implication as to geographical configuration or any physical or connectivity constraints. Thus, a distributed P2P gateway can comprise machines in different parts of the world or can be co-located in the same computer enclosure.

Figure 4:
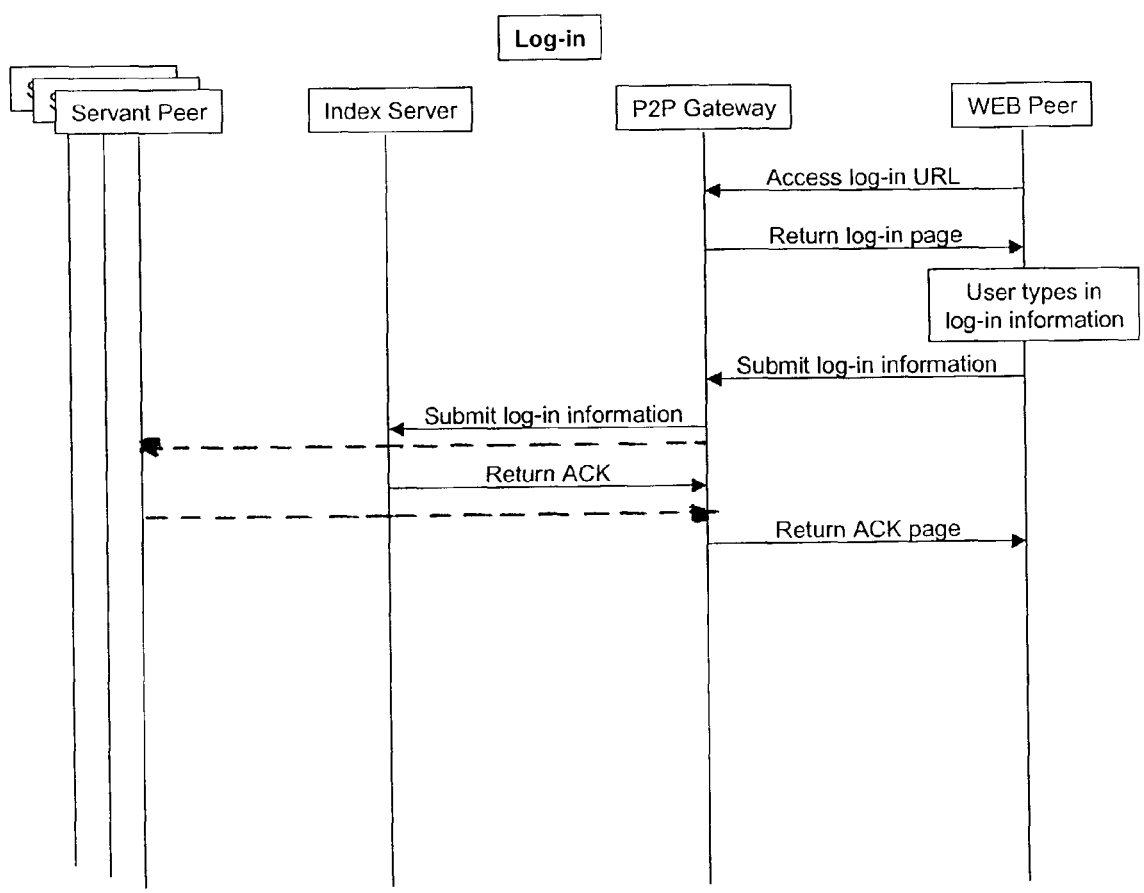
FIG. 4 highlights the communication exchange in an embodiment of a login sequence according to an aspect of the present invention.

FIG. 4 shows a sequence diagram illustrating a communication sequence for a LOGIN request in accordance with an embodiment of the present invention. The notion of logging on to a P2P network amounts to registering the presence of a peer to an index server, in the case of a hybrid P2P network. In the case of a pure P2P network, a peer simply registers its presence with another peer.

A Web browser desiring to access a P2P network begins by accessing the Web site associated with the P2P gateway server 102. This amounts to the user entering an appropriate URL (e.g., http://P2P-access.com). The URL connects the Web browser to the HTTP server component 206 of the P2P gateway server. In response, a Web page can be provided by the HTTP server component and may include a display to prompt the Web user for a name and/or some other identifying information. The user then enters suitable login information and perhaps other information if appropriate which is then sent to the HTTP server component. Then the HTTP server component and the gateway logic 202 cooperate to produce corresponding login-type information that is suitable for "logging" on to the P2P network. In one implementation, this may involve simply extracting relevant information from the HTTP message sent by the Web browser. In an alternative implementation, information contained in the HTTP message might be used to perform a table lookup operation in a data store accessible to the P2P gateway server to obtain login information suitable for the P2P network. It can be appreciated that still other techniques may be appropriate to implement.

Continuing, in the case of a hybrid P2P network, the peer function component 204, in cooperation with the gateway logic 202, can communicate the appropriate information to the index server 242 to perform the login operation, using a suitable P2P network communication protocol. Alternatively, the gateway logic and index server can interface directly, outside of the domain of the P2P network communication protocol to achieve the same result. In whatever manner this operation is performed, after all is said and done, the P2P network will "perceive" that a peer (our Web user) has connected to the P2P network.

Upon completion of the interaction with the index server 242, a message might be sent back to the P2P gateway server 102 indicating some form of acknowledgement from the index server; for example, the index server may provide an access control list (ACL). When the gateway logic 202, in cooperation with the peer function component 204, determines this, it can cooperate with the HTTP server component 206 to generate a suitable Web page or other suitable HTTP message which is then communicated to the Web browser.

In a pure P2P network, the P2P gateway server 102 would perform an equivalent action directly with a peer. This interaction is indicated in FIG. 4 by the dashed lines between the P2P gateway server and one of the peers in the P2P network. Recall for a pure P2P network, the peer user must know of another peer to which a connection attempt can be made. This may require multiple attempts, since there is not guarantee that any one peer is logged into the network. The P2P gateway server 102 can accumulate and maintain a list of peers it learns of over time. Alternatively, the P2P gateway server can access a Web site that provides a list of peers. Still other approaches can be employed.

Figure 5:
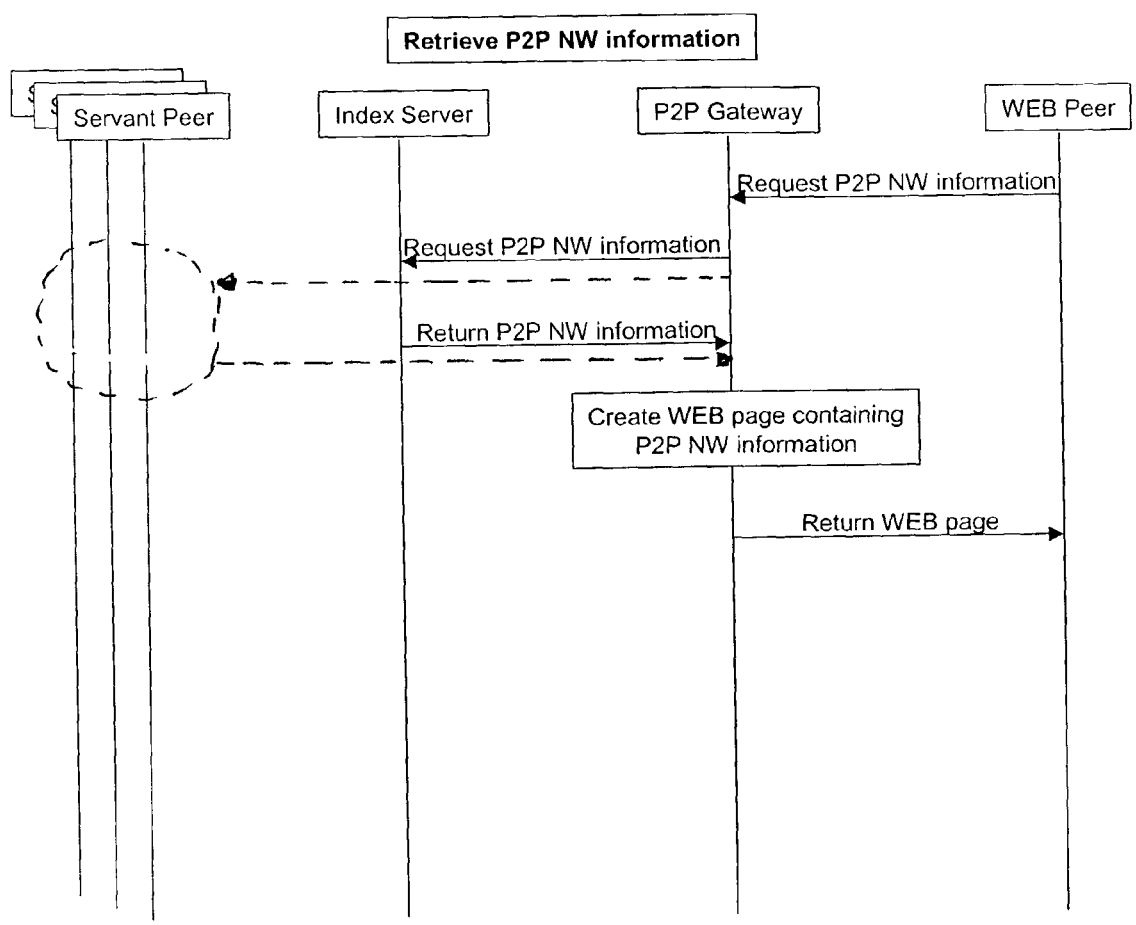
FIG. 5 highlights the communication exchange in an embodiment of an information acquisition sequence according to the present invention.
Figure 6:
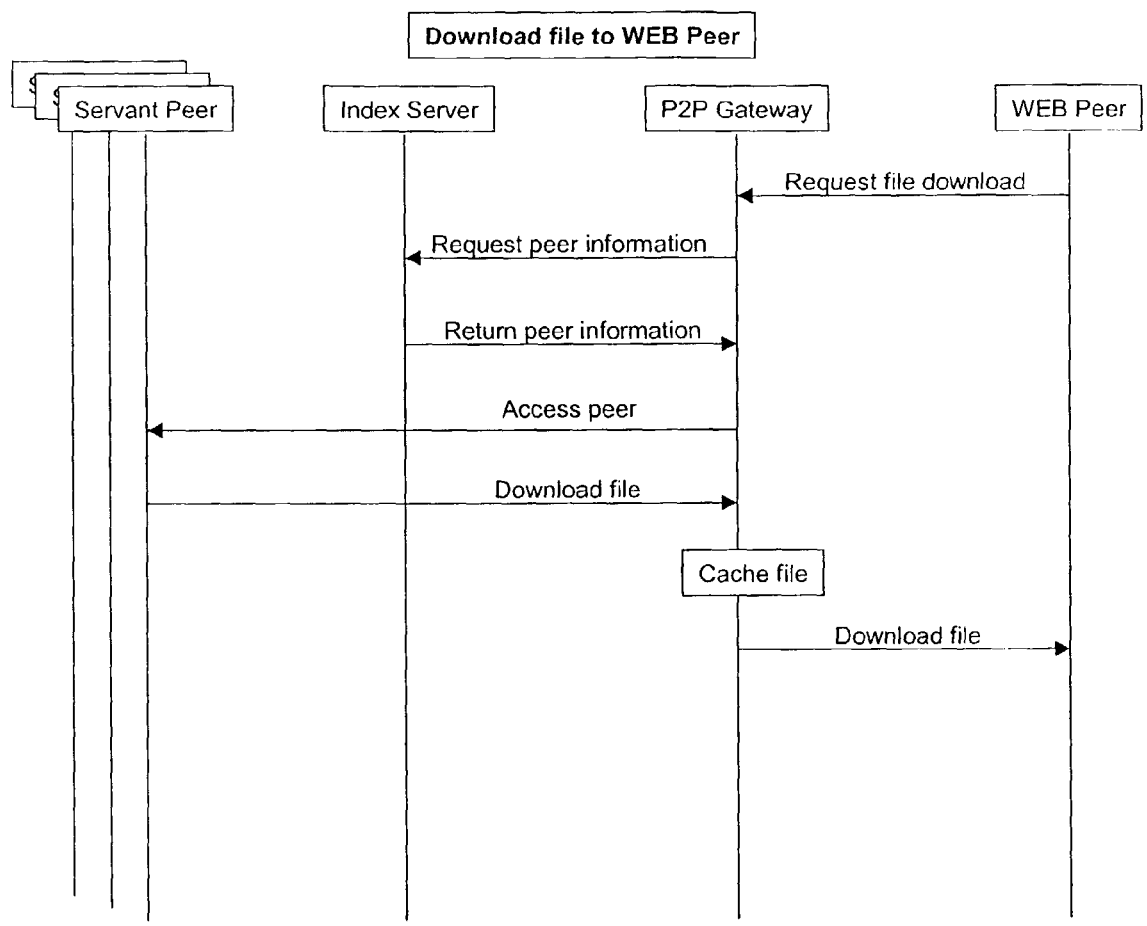
FIGS. 6 and 6A highlight the communication exchanges in an embodiment of a Web-side file retrieval sequence according to aspects of the present invention.

FIGS. 5 and 6 are sequence diagrams illustrating the exchange of communications according to a particular embodiment of the invention for retrieving a file from the P2P network. In FIG. 5, it may be desirable to first obtain a list of files that are available from the P2P network. Thus, after the Web user successfully logs on to the P2P network (to become a Web/peer user), a suitable Web page may be presented by the HTTP server component 204. The Web page may include file availability information, thus obviating the need to expressly obtain such information. Alternatively, it may be more practical to present some form of summary information representative of at least some of the files available on the P2P network. For example, U.S. application Ser. No. 10/159,144 describes a system that can be adapted for use in the present invention. The Web/peer user can then request additional information.

Thus, with respect to FIG. 5, the Web/peer browser may send a message to the P2P gateway server 102, indicating a request for some information; e.g., list of music files, list of files that begin with the letter "d", a list of the first 100 files, etc. The requested information can be anything; for example, who are the connected peers. The HTTP server component 206 receives the message from the Web/peer browser and, in cooperation with the gateway logic 202, produces equivalent information suitable for the P2P network.

In a hybrid P2P network, the gateway logic and the peer function component 202 can cooperate then to send suitable P2P messages to the index server 242 and/or to one or more peers. Alternatively, the gateway logic and the index server can interact directly.

One or more messages may then be sent from the P2P network (or from the index server, or both) to the P2P gateway server 102. The gateway logic 202 and the peer function component 204 can cooperate to obtain information from the received one or more messages in order to produce the information requested by the Web/peer user. Next, the gateway logic and the HTTP server component 206 cooperate to produce a suitably configured Web page containing the requested information. The Web page is then sent to the Web/peer browser and displayed to the user.

In a pure P2P network, the P2P gateway server 102 will communicate to one or more peers rather than to an index server in response to receiving a request for information from the Web/peer browser. This is shown generically in FIG. 5 by the dashed lines. The particular sequence of communications will depend on the particulars of the P2P network communication protocol for a given P2P network. For example, depending on the requested information, the P2P gateway server may have to interact with many peers, exchanging many messages to satisfy the request. In the case where the Web/peer user is interested in obtaining a file, the Web page will contain suitable information representative of available files that can be downloaded.

Referring then to FIG. 6, an illustrative sequence of communications between the Web/peer browser and the P2P gateway server 102 is shown to effect a download of a file to the Web/peer browser. The Web/peer browser communicates an HTTP message to the P2P gateway server 102 indicative of a file to be downloaded. The HTTP server component 206 receives the message and with the cooperation of the gateway logic 202 can produce information representing the file to be obtained.

This information is used by the gateway logic 202 in cooperation with the peer function component 204 to communicate suitable P2P network communication protocol messages to obtain the file. In the case of a hybrid P2P network, an index server 242 can be consulted by the peer function component 204 as a peer (using a suitable P2P networking communication protocol). Alternatively, the gateway logic can directly interact with the index server via some other interface. Typically, the index server will provide information representative of the peer(s) that contain the file. Note, that it is possible the file might be located in more than one peer, depending on the particular P2P network. In the case of a pure P2P network, the request from the Web/peer browser presumably contains information identifying the peer from which the file is to be obtained.

Next, the peer function component 204 communicates via appropriate P2P network messages with the peer identified as having a copy of the requested file. In this way, the peer function component appears to the peer as simply another peer desiring to access its file. Through interactions appropriate for the particular P2P network, a copy of the file is downloaded to the P2P gateway server. The gateway logic 202 and the HTTP server component 206, then cooperate to produce suitable HTTP messages to be communicated to the Web/peer browser.

Figure 6A:
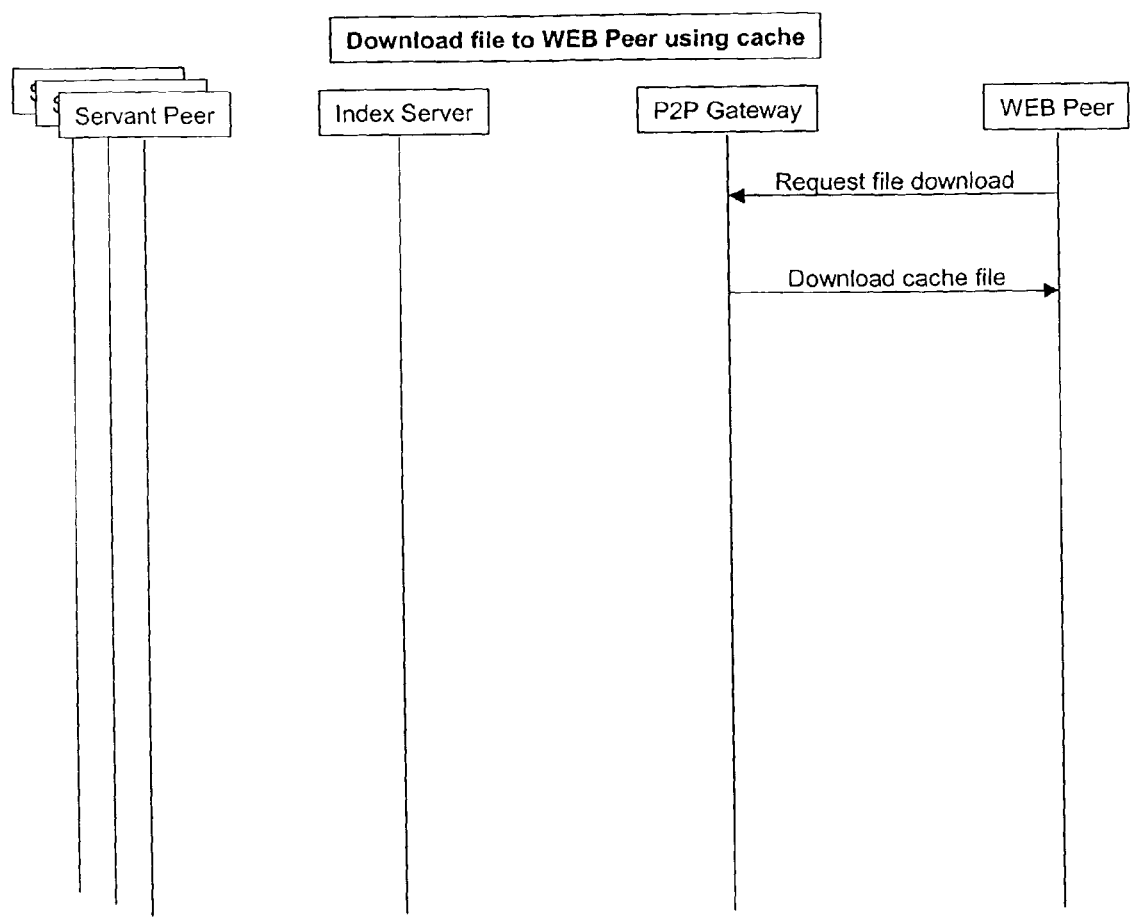

Referring for a moment to FIG. 3, in an alternate embodiment of the present invention, a data store 338 can be provided. The data store can be accessed over the network, or be configured with the P2P gateway server. The data store can serve as a cache to store the accessed file. The cache shown in FIG. 6 illustrates this aspect of the invention. Thus, files retrieved from a peer in the P2P network can be stored in the cache. Doing so, facilitates subsequent access to the requested file by other Web/peer users, providing improved file access performance in some cases. FIG. 6A illustrates this with a simple communication exchange for accessing a cached file. A request for a file download is satisfied by going to a cache accessible by the gateway server and downloading the cached file to the requesting client. Of course, it is understood that various common cache coherency issues must be addressed, and it can be appreciated that techniques for maintaining cache coherency, or otherwise responding to cache incoherencies are known.

Figure 7:
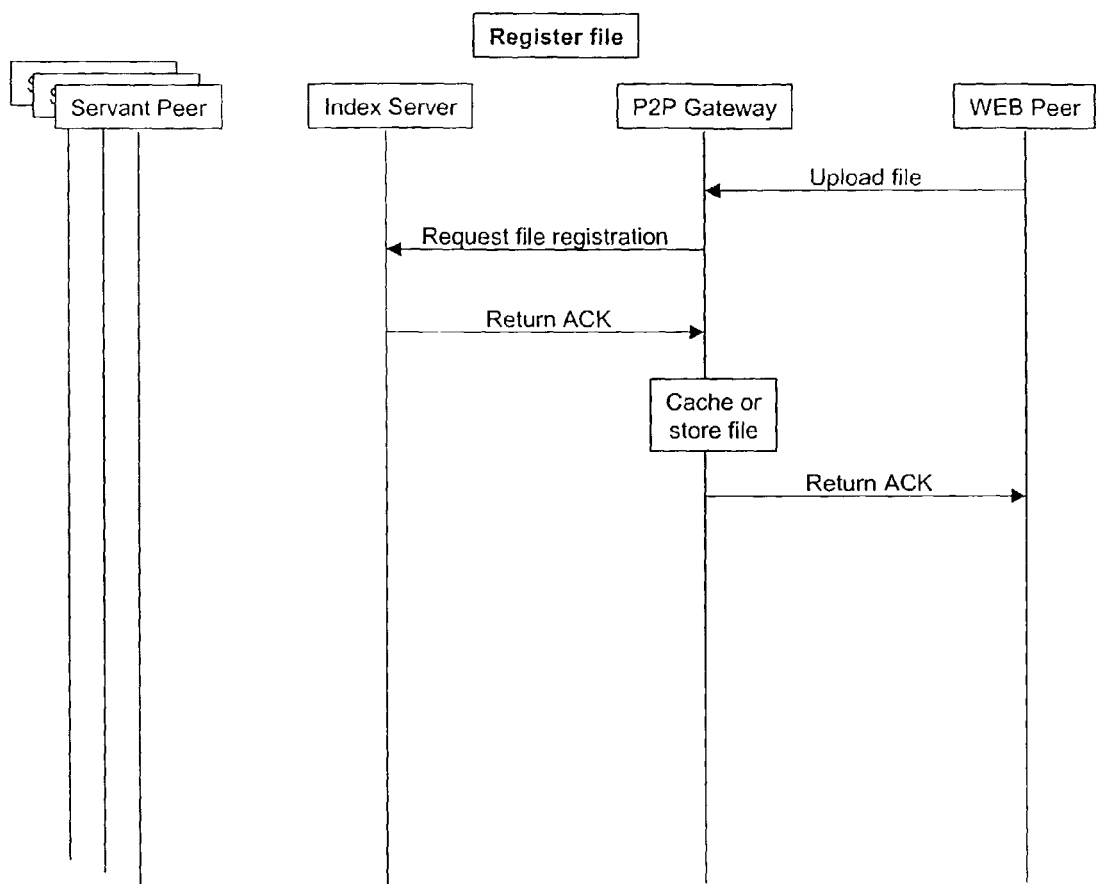
FIG. 7 highlights the communication exchange in an embodiment of a file registration sequence according to an aspect of the present invention.
Figure 8:
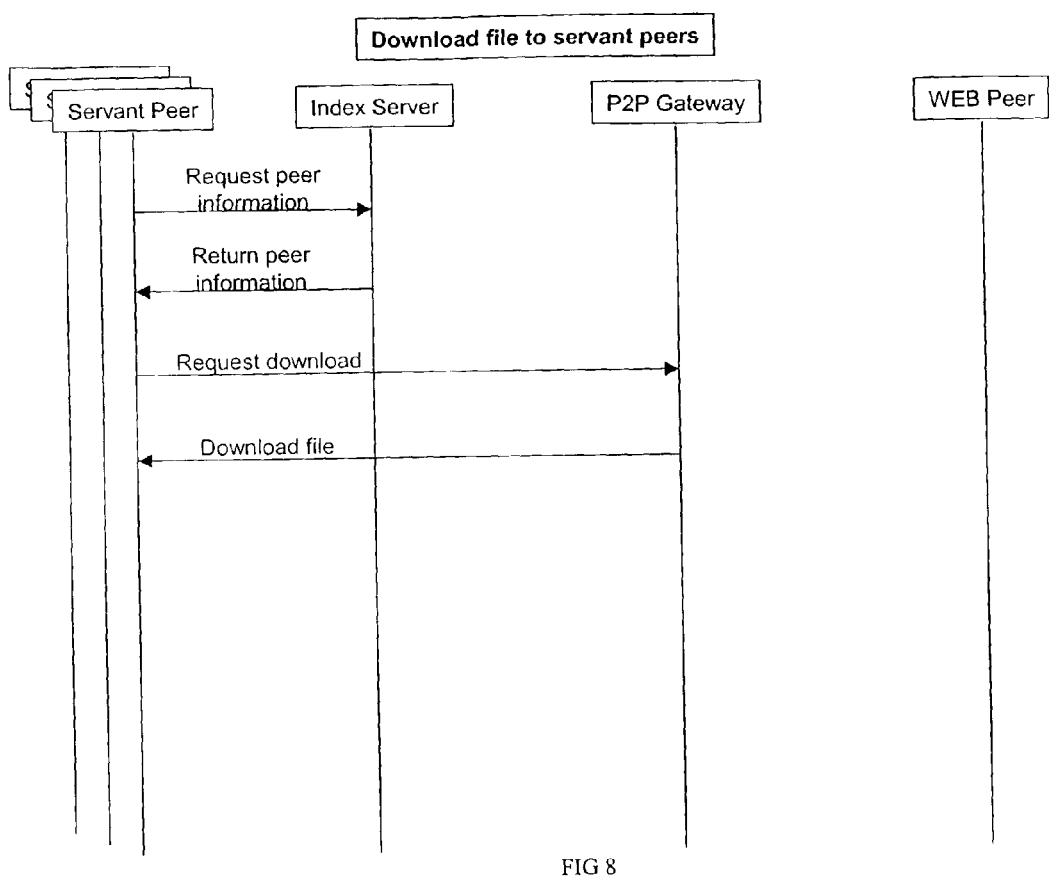
FIG. 8 highlights the communication exchange in an embodiment of a P2P-side file retrieval sequence according to an aspect of the present invention.

FIGS. 7 and 8 illustrate embodiments of an aspect of the invention for giving peers on a P2P network access to files from outside of the network. The figures show example sequences of communications for registering a file stored on a Web/peer browser so that peers on the P2P network can access it. The Web page presented by the P2P gateway server 102 queries the user to identify the location of the file to be registered to the P2P network. Since the Web/peer browser is not a true peer on the P2P network, a Web/peer user wishing to "register" her file(s) must upload the files to the P2P gateway server. As will be explained, the files can then be accessed by the P2P network from the P2P gateway server. Thus, the Web page presented to the user includes suitable HTML commands for uploading the file(s) to the P2P gateway server.

FIG. 7 shows a Web/peer browser sending a message(s) to the P2P gateway server 102, containing the file to be "registered" or "posted" to the P2P network. Peers in a P2P network make their files available to other peers by an operation which can be variously referred to as "registering" or "posting" their file. A Web/peer can accomplish the same with its files. Thus, the HTTP server component 206 receives the "register" message(s) and in cooperation with the gateway logic 202 produces information representing the files and access control information that any peer on the P2P network can associate with its files. The gateway logic can store the files in a suitable data store (e.g., data store 338, FIG. 3) accessible by the gateway logic.

FIG. 7 also shows that in a hybrid P2P network, an index server 242 can be accessed to register the files in the server. As previously discussed, the index server can be accessed by the peer function component 204 as a peer in the P2P network, or the gateway logic can directly access the index server. Similarly, in a pure P2P network, one or more peers are informed of the Web/peer file. The specifics of which peer(s) are chosen and how the information is made known to the other peers depend on the particular P2P network.

FIG. 8 shows a communication sequence wherein peers in the P2P network can access the Web/peer file. In the case of a hybrid P2P network, a requesting peer will consult the index server and learn that the file resides in the P2P gateway server 102. The requesting peer will then communicate with the P2P gateway server, specifically the peer function component 204. The peer function component can then access (possibly with the help of the gateway logic 202) the data store (e.g., 338) which contains the file. The file is then communicated to the requesting peer.

In the case of a pure P2P network, FIG. 8 illustrates that the peer can learn of the file in a manner dictated by operation of the particular P2P network. A peer desiring the file, by virtue of knowing where it is, can access the P2P gateway server 102 and obtain the file in the manner discussed above. In both hybrid and pure P2P network configurations, any applicable access control mechanism provided by the P2P network can be implemented in the P2P gateway server as if the P2P gateway server was just another peer on the network.

From the foregoing, it can be appreciated that the P2P gateway server acts as a proxy for the Web/peer user. The P2P gateway server serves to isolate the Web browser from the P2P network, which may be a desirable feature to the user, while at the same time providing access to peers in the P2P network and allowing the Web user to post files to the P2P network.

Referring to FIG. 3 for a moment, a second P2P gateway server 302a is shown in an embodiment according to an aspect of the invention. Web browsers accessing the first P2P gateway server 302 can get "bounced" to the second P2P gateway server 302a. There are situations where this may be appropriate. For example, re-direction of messages may be desirable for load balancing reasons. One P2P gateway server may be offline for some reason such as maintenance, or unexpected failure. In either case, it is desirable to be able to re-direct messages to a backup P2P gateway server. Other reasons may be based on security concerns, a desire to use a geographically closer P2P gateway server, and so on. It may be desirable to make multiple re-directs. It is known to those of ordinary skill in the relevant arts how Web browsers can be transparently re-directed without the user being aware of the action. Still another reason for the second P2P gateway server 302a is the existence of a P2P network that is separate from the P2P network serviced by the first P2P gateway server 302.

Figure 6B:
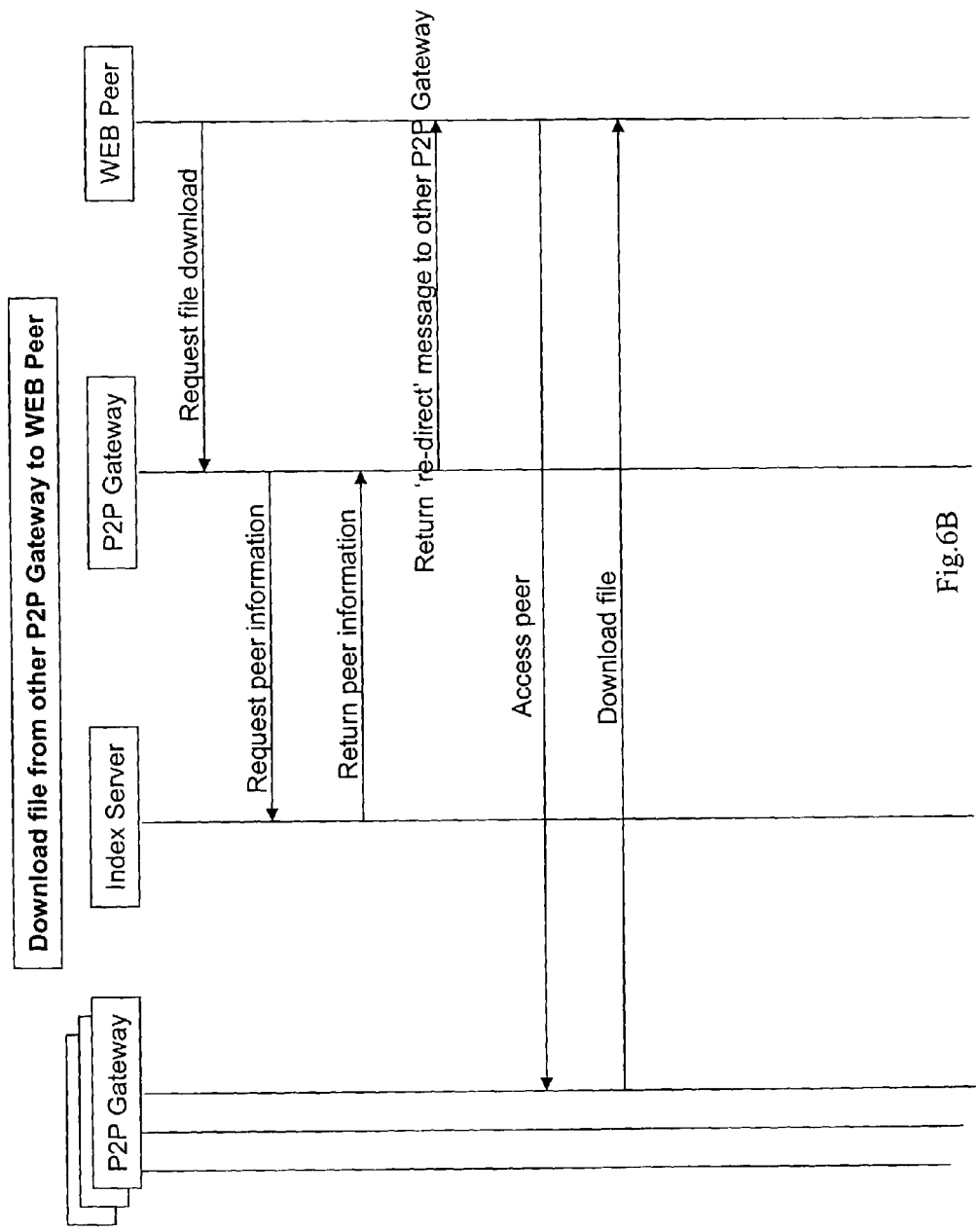
FIG. 6B highlights the communication exchanged in an embodiment of a retrieval that involves at least a second P2P gateway server in accordance with an aspect of the present invention.

FIG. 6B shows an illustrative sequence of communications between the Web/peer browser and the P2P gateway server 302 (FIG. 3) to access a second P2P network. As shown in FIG. 6B, the Web/peer browser 112 (FIG. 1) can communicate an HTTP message to the P2P gateway server 302 indicative of a file to be downloaded. In response, the P2P gateway can access an index server 242 to acquire information of those peers that have the requested file. Alternatively, that information can be known to the P2P gateway server 302 absent the index server, for example, simply by having the information configured in the gateway server or otherwise made known to the gateway server.

Suppose the file is on another peer network and is accessible via P2P gateway server 302a. The P2P gateway server 302 knowing this, returns a re-direct message to the Web/peer browser with information indicating an address of the P2P gateway 302a. The Web/peer browser then reroutes its HTTP request to the P2P gateway 302a. Access to the second gateway, for example a download of a file, can then take place between the Web/peer browser 112 and the P2P gateway 302a in the manner as discussed above. It is noted that the P2P gateway 302a does not have to have protocol translation function that is present in the P2P gateway 302. Instead, the gateway 302a only needs a Web interface that can interact with the Web peer to perform the file transfer. In this sense, the gateway 302a is more like a regular peer that has Web interface.

In another embodiment according to another aspect of the invention, a Web/peer browser can access a virtual directory construct in a hybrid P2P network. The Web/peer can use a conventional URL to access that directory. For example, to access a directory/root/image/mountains/ in an index server having a host name of www.mountainpics.com, the user can enter the following URL:

http://www.mountainpics.com/root/image/mountains/.

The Web browser accesses the index server, which then can re-direct the Web browser to a P2P gateway server at another address; for example, at http://133.144.79.2/root/image/mountains/. At that point, the P2P gateway server can access the requested file(s) and return them to the Web browser in an appropriate Web page(s).

In an embodiment according to still another aspect of the invention, a P2P gateway server can act as a peer for each Web browser accessing the P2P gateway server. In this way, the P2P gateway server appears to the P2P network as separate peers, one for each Web/peer connecting to the P2P network.

In a hybrid P2P network, the P2P gateway server can maintain multiple sessions between the index server and the other peers. This approach has the benefit of operating in existing P2P architectures without modification to the P2P networking programs and P2P network communication protocol. The P2P gateway server is completely transparent to the P2P network.

In an alternate embodiment of this aspect of the invention, the P2P gateway server can act as a single peer for multiple Web/peer connections. In a hybrid P2P network, this requires only a single session with the index server and with the other peers. However, depending on the implementation of a particular P2P architecture, this approach may require changes to the P2P networking programs and/or the P2P network communication protocol. On the other hand, this method is more scalable since there will be fewer sessions to manage.

What is claimed is:

1. In a network system including a plurality of clients, a first gateway server, an index server, and a second gateway server, a method for accessing a peer-to-peer (P2P) network, comprising the steps of:

executing, by a first client, a networking program that is different from a P2P networking program, for communication with the first gateway server using a network communication protocol that is different from a P2P communication protocol;

sending, by the first client, a first request to the first gateway to obtain a file using the network communication protocol;

receiving, by the first gateway server, the first request from the first client;

sending, by the first gateway server, a second request to the index server using the P2P communication protocol, to obtain information, related to the file, of a second client executing the P2P networking program;

receiving, by the first gateway server, an address of the second gateway server, having access to the second client, from the index server;

transmitting, by the first gateway server, to the first client the address of the second gateway server;

sending, by the first client, a third request to the second gateway server to obtain the file using the network communication protocol;

sending, by the second gateway server, a fourth request using the P2P communication protocol to the second client to obtain the file, the fourth request being created based at least in part on the third request;

sending the file, by the second client, to the second gateway server; and sending the file to the first client, by the second gateway server.

2. The method of claim 1 wherein the first gateway server manages a first P2P network and the second gateway server manages a second P2P network including the second client, the second P2P network being different from the first P2P network.

3. The method of claim 1 wherein the networking program executed by the first client is a Web browser.

* * * * *

UNITED STATES PATENT AND TRADEMARK OFFICE
CERTIFICATE OF CORRECTION

PATENT NO. : 7,769,881 B2
APPLICATION NO. : 10/351197
DATED : August 3, 2010
INVENTOR(S) : Daisuke Mastubara It is certified that error appears in the above-identified patent and that said Letters Patent is hereby corrected as shown below:

Cover Page:

Item (54) as indicated below:

"METHOD AND APPARATUS FOR PEER-TO PEER ACCESS"

should read,

-- METHOD AND APPARATUS FOR PEER-TO-PEER ACCESS --

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,769,881 B2  Page 1 of 1
APPLICATION NO. : 10/351197
DATED : August 3, 2010
INVENTOR(S) : Daisuke Mastubara It is certified that error appears in the above-identified patent and that said Letters Patent is hereby corrected as shown below:

Cover Page, Item (54) and at Column 1, lines 1 and 2, Title:

as indicated below:

"METHOD AND APPARATUS FOR PEER-TO PEER ACCESS"

should read,

-- METHOD AND APPARATUS FOR PEER-TO-PEER ACCESS --

This certificate supersedes the Certificate of Correction issued November 16, 2010.

Signed and Sealed this

Fourteenth Day of December, 2010

David J. Kappos
*Director of the United States Patent and Trademark Office*